United States Patent
Baillargeon et al.

(10) Patent No.: US 9,906,450 B2
(45) Date of Patent: Feb. 27, 2018

(54) METHOD AND SYSTEM FOR HANDLING ERROR INDICATIONS

(71) Applicant: Telefonaktiebolaget L M Ericsson (Publ), Stockholm (SE)

(72) Inventors: Steve Baillargeon, Gattineau (CA); Peter Nilsson, Haegersten (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 896 days.

(21) Appl. No.: 13/727,185

(22) Filed: Dec. 26, 2012

(65) Prior Publication Data

US 2014/0019581 A1 Jan. 16, 2014

Related U.S. Application Data

(60) Provisional application No. 61/671,997, filed on Jul. 16, 2012.

(51) Int. Cl.
*G06F 15/16* (2006.01)
*H04L 12/70* (2013.01)
*H04W 28/12* (2009.01)
*H04L 12/24* (2006.01)
*H04L 12/823* (2013.01)

(52) U.S. Cl.
CPC .......... *H04L 47/00* (2013.01); *H04L 41/0613* (2013.01); *H04L 41/0622* (2013.01); *H04W 28/12* (2013.01); *H04L 47/323* (2013.01)

(58) Field of Classification Search
CPC ....... H04W 28/12; H04L 47/00; H04L 47/323
See application file for complete search history.

(56) References Cited

U.S. PATENT DOCUMENTS

| | | | |
|---|---|---|---|
| 6,456,624 B1 * | 9/2002 | Eccles et al. | 370/400 |
| 6,904,286 B1 | 6/2005 | Dantu | |
| 2008/0137689 A1 * | 6/2008 | Shiizaki | H04L 47/283 370/498 |

(Continued)

OTHER PUBLICATIONS

PCT Invitation to Pay Additional Fees, Form PCT/ISA/206, dated Nov. 27, 2013 for corresponding International Application No. PCT/IB2013/055262; International Filing Date: Jun. 26, 2013 consisting of 7-pages.

(Continued)

*Primary Examiner* — Philip Chea
*Assistant Examiner* — Mohammed Ahmed
(74) *Attorney, Agent, or Firm* — Patent Portfolio Builders, PLLC

(57) ABSTRACT

A method for handling transmission of error indication messages in a communication network is provided. A destination computer associated with a destination address receives a user data packet from a source computer associated with a source address. A determination is made as to whether a destination identifier included in the user data packet is known. If it is determined that the destination identifier is known, then the user data packet is transmitted to a destination associated with the destination identifier. Else, the transmission of the first error indication message is delayed and the transmission of subsequent error indication messages is paced if subsequent user data packets received from the source computer include the unknown destination identifier.

14 Claims, 7 Drawing Sheets

(56) References Cited

U.S. PATENT DOCUMENTS

2012/0243400 A1* 9/2012 Lefrancois et al. .......... 370/216

OTHER PUBLICATIONS

3GPP TS 23.007 V11.2.0 (Jun. 2012), "3rd Generation Partnership Project; Technical Specification Group Core Network and Terminals; Restoration procedures (Release 11)" consisting of 64 pages.
3GPP TS 29.281 V11.3.0 (Jun. 2012), "3rd Generation Partnership Project; Technical Specification Group Core Network and Terminals; General Packet Radio System (GPRS) Tunnelling Protocol User Plane (GTPv1-U) (Release 11)" consisting of 26 pages.
PCT International Search Report and Written Opinion dated May 30, 2014 for corresponding International Application No. PCT/IB2013/055262; International Filing Date: Jun. 26, 2013 consisting of 16-pages.

* cited by examiner

FIG. 2

| 34 ↘ SOURCE ADDRESS 38 | DESTINATION ADDRESS 40 | DESTINATION IDENTIFIER 36 | USER PAYLOAD 44 |
|---|---|---|---|
| 10.1.2.9 | 10.10.10.10 | 0x01FFFFFF | |

| INGRESS UNKNOWN DESTINATION TABLE FOR RECEIVING GTP-U DATA PLANE ENTITY WITH IP ADDRESS 10.10.10.10 ||||| 
|---|---|---|---|---|
| UNKNOWN DESTINATION IDENTIFIER 36 | SOURCE ADDRESS 38 | ERROR INDICATION SENT FLAG 46 | FIRST TRANSMISSION TIMER 48 | RETRANSMISSION TIMER 50 |
| 0xABABABAB | 10.1.2.3 | 1 | expired | not expired |
| 0x01FFFFFF | 10.1.2.9 | 0 | expired | not started |
| 0x03FF01FF | 10.1.2.8 | 0 | started | not started |

| INGRESS KNOWN DESTINATION TABLE FOR RECEIVING GTP-U DATA PLANE ENTITY WITH IP ADDRESS 10.10.10.10 |
|---|
| KNOWN DESTINATION IDENTIFIER 36 |
| 0x01FF21FF |

24

| EGRESS DESTINATION TABLE FOR SENDING GTP-U DATA PLANE ENTITY WITH IP ADDRESS 10.1.2.9 |||
|---|---|---|
| KNOWN DESTINATION IDENTIFIER 36 | DESTINATION ADDRESS 40 | ERROR INDICATION RECEIVED FLAG 52 |
| 0x01FAFFEF | 10.20.20.20 | 0 |
| 0x01FF21FF | 10.10.10.10 | 0 |
| 0x01FFFFFF | 10.10.10.10 | 1 |

| FIRST ERROR INDICATION MESSAGE ||||
|---|---|---|---|
| 39 SOURCE ADDRESS 10.10.10.10 | 41 DESTINATION ADDRESS 10.1.2.9 | 56 INFORMATION ||
| ||36 TEID 0x01FFFFFF | DESTINATION ADDRESS 40 10.10.10.10 |

| SUBSEQUENT ERROR INDICATION MESSAGE ||||
|---|---|---|---|
| 39 SOURCE ADDRESS | 41 DESTINATION ADDRESS | 56 INFORMATION ||
| ||36 TEID | DESTINATION ADDRESS 40 |

FIG. 7

METHOD AND SYSTEM FOR HANDLING ERROR INDICATIONS

CROSS-REFERENCE TO RELATED APPLICATION

This application is: related to and claims priority to U.S. Provisional Application Ser. No. 61/671,997, filed Jul. 16, 2012, entitled METHOD AND SYSTEM FOR HANDLING ERROR INDICATIONS, the entirety of which is incorporated herein by reference.

STATEMENT REGARDING FEDERALLY SPONSORED RESEARCH OR DEVELOPMENT n/a

TECHNICAL FIELD

The present invention relates to network communications, and in particular to controlling or reducing the transmission of error indication messages in a communication network.

BACKGROUND

General Data packet Radio Service ("GPRS") is a standard for wireless communications that supports a wide range of bandwidths. The GPRS Tunneling Protocol ("GTP") is a group of Internet Protocol ("IP") based communications protocols used to carry GPRS within, for example, Global System for Mobile Communication ("GMS"), Universal Mobile Telecommunications System ("UMTS") and Long Term Evolution ("LTE") networks. GTP can be decomposed into the GTP control plane protocol ("GTP-C") used to carry tunnel establishment signals, and the GTP user plane protocol ("GTP-U") used to carry encapsulated data-related signals.

Current handling of GTP-U error indication messages, as described in the $3^{rd}$ Generation Partnership Project ("3GPP") standard specification, ignores dependency on other parts of the end-to-end system. This may potentially cause race conditions which trigger undesirable release procedures by the control plane protocol, such as the S1-AP control plane protocol. These procedures may have a direct impact on the subscriber's quality of experience, as the procedures cause the subscriber to temporarily lose its connectivity to the network traffic overload and unfairness conditions on the GTP-U nodes.

The 3GPP standard specification TS 29.281 describes in the User Plane section how to handle the transmission of GTP-U error indications across the S1-U interface between a Evolved Node B ("eNB") and a Service Gateway ("SGW"). In particular, when a GTP-U node receives a GTP-U data packet carrying a user data message, i.e., a GTP protocol data unit ("G-PDU") for which no Evolved Data packet System ("EPS") bearer context or radio access bearer ("RAB") exists, the GTP-U node discards the unknown G-PDU and returns a GTP error indication to the originating node. The tunnel endpoint identifier ("TEID") from the unknown G-PDU is copied to the TEID I information element of the outgoing error indication message. Similar principles and rules apply for other GTP-U interfaces like the S5, Iu and Service GPRS Support Node ("SGSN") to Gateway GPRS Support Node ("GGSN") ("Gn") interfaces.

The 3GPP standard specification TS 23.007 describes in the Restoration Procedures section how to handle the reception of GTP-U error indications at the eNB and SGW. In particular, the standards indicate that if the SGW receives a GTP error indication for a bearer context from an eNodeB for an 'active' mode User Equipment ("UE"), the SGW deletes all the GTP-U tunnels for this UE. The SGW further sends a downlink data notification message to the Mobility Management Entity ("MME"). If the MME receives a downlink data notification message from the SGW as a result of the SGW having received an error indication message from the eNodeB, the MME performs an S1 release procedure if the UE is in a connected state. The MME further performs a network triggered service request procedure as specified in the 3GPP standard specification TS 23.401.

If the eNodeB receives a GTP error indication from the SGW over an S1-U tunnel not doing indirect forwarding, the eNodeB initiates the Evolved Universal Terrestrial Radio Access Network RAB ("E-RAB") release procedure and immediately locally releases the E-RAB without waiting for a response from the MME. The eNB ignores the GTP-U error indications received on X2-U interfaces or any direct forwarding tunnels between two eNBs. The same principles or rules apply to other GTP-U nodes like Packet Data Network Gateway ("PGW") node, a Radio Network Controller ("RNC") node, a Service GPRS Support Node ("SGSN"), and a Gateway GPRS Support Node ("GGSN").

When the first unicast G-PDU for an unknown TEID is received, an error indication message is immediately transmitted to the GTP-U peer. Such behavior triggers the complete removal of the UE context and all associated UE bearers when one of the bearers is pre-empted (i.e., intentionally released due to radio link resource contention) on a radio node like the eNB. When a subscriber bearer is pre-empted, the bearer and associated tunnel endpoint are immediately removed by the receiving GTP-U user plane entity that is triggering the pre-emption action while the release signaling indication to inform the sending GTP-U user plane entity is in transit. If the receiving GTP-U user plane entity is actively receiving data when the bearer is pre-empted, the sending GTP-U user plane entity will receive one or more error indications before the bearer is release on its node through normal signaling procedures. This creates an undesirable race condition between the user plane error message and the control plane release message which triggers the S1 release procedure, directly impacting the quality of the subscriber experience.

For each received G-PDU for an unknown TEID, a unicast error indication message is transmitted to the GTP-U peer. The incoming volume and the receiving rate of user data messages with unknown TEIDs dictates the outgoing volume and the transmitting rate of error indication messages potentially causing overload and unfairness on the sending GTP-U user plane entity and/or the receiving GTP-U user plane entity, which wastes valuable bandwidth resources. Outgoing and incoming error indications are usually handled in the slow path and a single faulty subscriber connection may consume all of the nodal resources leaving none for the other faulty subscriber connections.

For each received error indication message, a faulty tunnel notification is sent to the GTP-U control plane entity responsible to release the subscriber connection. The incoming volume and receiving rate of error indication messages may cause overload on the GTP-U control plane entity.

SUMMARY

The present invention advantageously provides a method and system for handling error indication messages in a communication network. According to one aspect, the invention provides a method for handling transmission of error indication messages in a communication network. A destination computer associated with a destination address receives a user data packet from a source computer associated with a source address. A determination is made as to whether a destination identifier included in the user data packet is known. If it is determined that the destination identifier is known, then the user data packet is transmitted to a destination associated with the destination identifier. Else, if it is determined that the destination identifier is unknown, then the transmission of the first error indication message is delayed; and the transmission of subsequent error indication messages is paced if subsequent user data packets received from the source computer include the unknown destination identifier.

In one embodiment according to this aspect, delaying the transmission of the first error indication message includes determining whether an unknown destination table includes the unknown destination identifier in association with the source address. If it is determined that the unknown destination table does not include the unknown destination identifier in association with the source address, then the unknown destination identifier in association with the source address and an error indication sent flag indicating that the first error indication message has not been sent to by the destination computer to the source computer are stored in the unknown destination table. In yet another embodiment, if it is determined that the unknown destination table does not include the unknown destination identifier in association with the source address, a first transmission timer is started and the user data packet is discarded. The first transmission timer defines a predetermined time to delay transmission of the first error indication message. In one embodiment, delaying the transmission of the first error indication message includes determining that the unknown destination table includes the unknown destination identifier in association with the source address. A determination is made as to whether the transmission of the first error indication message has been delayed for the predetermined amount of time. In some embodiments, the destination identifier is a GTP-U tunnel endpoint identifier and the destination address is an Internet Protocol address. In yet another embodiment, if it is determined that the transmission of the first error indication message has been delayed for the predetermined amount of time, then the first error indication message is transmitted. Else, if it is determined that the transmission of the first error indication message has not been delayed for the predetermined amount of time, then the user data packet is discarded. In this embodiment, the user data packet includes a payload. In yet another embodiment, if it is determined that the transmission of the first error indication message has been delayed for the predetermined amount of time, then the user data packet is discarded; and a retransmission timer is started. The retransmission timer defines a retransmission time to delay transmission of a subsequent error indication message if the subsequent user data packet received from the source computer includes the unknown destination identifier. In yet another embodiment, if the first error indication message has been transmitted, pacing the transmission of subsequent error indication messages includes determining whether the retransmission timer has expired. If it is determined that the retransmission timer has expired, then the user data packet is discarded, the subsequent error indication message is transmitted; and the retransmission timer is restarted. Else, if it is determined that the retransmission timer has not expired, then the user data packet is discarded.

According to another aspect, the invention provides a method for transmitting a release notification message. An error indication message from a first computer is received at a second computer, the error indication message includes a destination identifier and an address associated with the first computer. A determination is made as to whether, in response to receiving the error indication message, a first release notification message was transmitted to a control module in the second computer. The control module is configured to release a bearer connection associated with the destination identifier. If it is determined that the first release notification message has been transmitted to the control module, then the transmission of subsequent release notification messages to the control module is stopped if subsequent received error indication messages include the destination identifier and the address.

In one embodiment according to this aspect, the release notification message is configured to trigger release of the bearer connection. Stopping the transmission of subsequent release notification messages to the control module includes discarding subsequent received error indication messages if subsequent received error indication messages include the destination identifier and the address. In another embodiment, if it is determined that the first release notification message has not been transmitted to the control module, the first release notification message is transmitted and the error indication message is discarded.

According to yet another aspect, the invention provides a computer for handling transmission of error indication messages in a communications network. The computer includes a transmitter, a receiver in communication with the transmitter, and a processor in communication with the transmitter and the receiver. The receiver is configured to receive a user data packet from a source computer associated with a source address. The processor is configured to determine whether a destination identifier included in the user data packet is known. If the processor determines that destination identifier is known, then the transmitter is configured to transmit the user data packet to a destination associated with the destination identifier. Else, if the processor determines that the destination identifier is unknown, then the processor is further configured to delay the transmission of the first error indication message; and pace the transmission of subsequent error indication messages if subsequent user data packets received from the source computer include the unknown destination identifier.

In one embodiment according to this aspect, the computer includes a memory in communication with the processor, the transmitter and the receiver. The memory is configured to store an unknown destination table. The processor determines whether the unknown destination table includes the unknown destination identifier in association with the source address. If the processor determines that the unknown destination table does not include the unknown destination identifier in association with the source address, then the memory stores in the unknown destination table the unknown destination identifier in association with the source address; and an error indication sent flag indicating that the first error indication message has not been sent to the source computer. In one embodiment, if the processor determines that the unknown destination table does not include the unknown destination identifier in association with the source address, the processor is further configured to start a first transmission timer, the first transmission timer defining a predetermined time to delay transmission of the first error indication message; and discard the user data packet. In another embodiment, delaying the transmission of the first error indication message includes the processor determining that the unknown destination table includes the unknown destination identifier in association with the source address. If the processor determines that the unknown destination table includes the unknown destination identifier in association with the source address, the processor determines whether the transmission of the first error indication message has been delayed for the predetermined amount of time. In another embodiment, the unknown destination table includes an entry that includes the unknown destination identifier in association with the source address. The processor is further configured to delete the entry after a predetermined number of subsequent error indication messages have been transmitted by the transmitter. In yet another embodiment, if the processor determines that the transmission of the first error indication message has been delayed for the predetermined amount of time, then the transmitter transmits the first error indication message. Else, if the processor determines that the transmission of the first error indication message has not been delayed for the predetermined amount of time, then the processor discards the user data packet, wherein the user data packet includes a payload. In another embodiment, if the processor determines that the transmission of the first error indication message has been delayed for the predetermined amount of time, then the processor is further configured to discard the user data packet; and start a retransmission timer. The retransmission timer defines a retransmission time to delay transmission of a subsequent error indication message if the subsequent user data packet received from the source computer includes the unknown destination identifier. In one embodiment, if the processor determines that the first error indication message has been transmitted, pacing the transmission of subsequent error indication messages further includes the processor determining whether the retransmission timer has expired. If the processor determines that the retransmission timer has expired, then the processor is further configured to: discard the user data packet; and restart the retransmission timer. The transmitter transmits the subsequent error indication message. Else, if the processor determines that the retransmission timer has not expired, then the processor discards the user data packet.

According to yet another aspect, the invention provides a computer for transmitting a release notification message. The computer includes a receiver, a control module in communication with the receiver, and a processor in communication with the receiver and the control module. The receiver is configured to receive an error indication message from a first computer. The error indication message includes a destination identifier and an address associated with the first computer. The control module is configured to determine whether to release a bearer connection associated with the destination identifier. The processor is configured to determine whether, in response to receiving the error indication message, a first release notification message was transmitted to the control module. If the processor determines that the first release notification message has been transmitted to the control module, then the processor does not transmit subsequent release notification messages to the control module if subsequent received error indication messages include the destination identifier and the address. In one embodiment, the release notification message is configured to trigger release of a bearer connection associated with the destination identifier. Not transmitting subsequent release notification messages to the control module includes the processor discarding subsequent received error indication messages if subsequent received error indication messages include the destination identifier and the address. In one embodiment, the computer includes a transmitter in communication with the processor and the receiver. If the processor determines that the first release notification message has not been transmitted to the control module, then the transmitter is configured to transmit the first release notification message. The processor is further configured to discard the error indication message.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 2 is a block diagram of an exemplary user data packet constructed in accordance with the principles of the present invention;

FIG. 3 is a block diagram of an exemplary unknown destination table constructed in accordance with the principles of the present invention;

FIG. 4 is a block diagram of an exemplary known destination table constructed in accordance with the principles of the present invention;

FIG. 5 is a block diagram of another exemplary known destination table constructed in accordance with the principles of the present invention;

FIG. 6 is a block diagram of an exemplary first error indication message in accordance with the principles of the present invention;

FIG. 7 is a block diagram of an exemplary subsequent error indication message in accordance with the principles of the present invention;

DETAILED DESCRIPTION OF THE INVENTION

Figure 1:
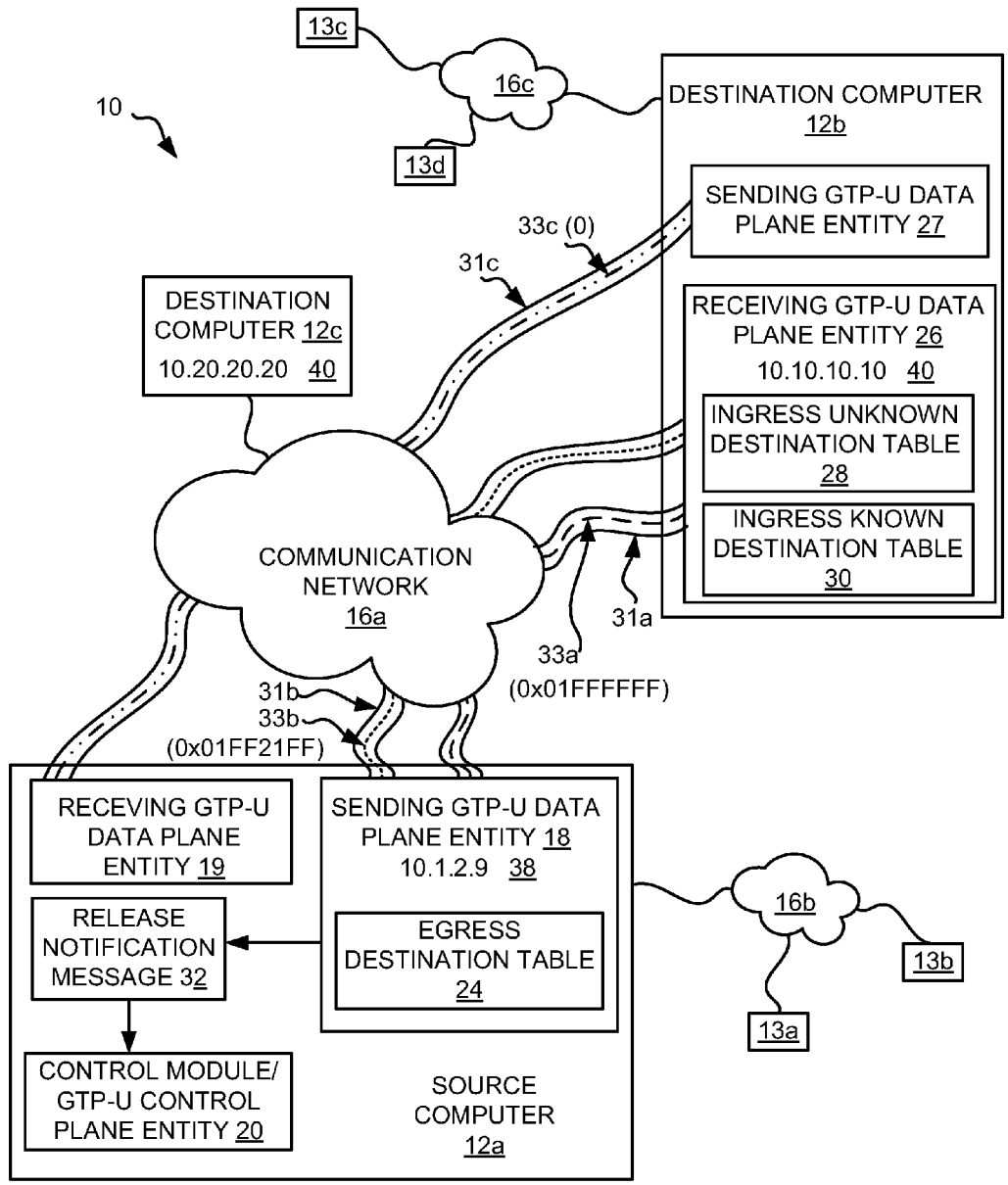
FIG. 1 is a diagram of an exemplary system for handling error indication messages in accordance with the principles of the present invention.

Before describing in detail exemplary embodiments that are in accordance with the present invention, it is noted that the embodiments reside primarily in combinations of apparatus components and processing steps related to implementing a method and a computer for handling transmission of error indication messages in a communication network. Accordingly, the method and computer device components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to the drawing figures in which reference designators refer to like elements, there is shown in FIG. 1 a diagram of an exemplary system constructed in accordance with the principles of the present invention and designated generally as "10." System 10 includes source computer 12a in communication with destination computer 12b and destination computer 12c via communication network 16a. Source computer 12a and destination computers 12b and 12c are collectively referred to herein as computer 12. Source computer 12a may include sending GTP-U data plane entity 18, receiving GTP-U data plane entity 19 and control module/GTP-U control plane entity 20. Sending GTP-U data plane entity 18 includes egress destination table 24. Sending GTP-U data plane entity 18 has a source address 38, which may be an IP address or any other label which uniquely identifies GTP-U data plane entity 18. Source computer 12a is associated with the source address 38, which may be 10.1.2.9.

Destination computer 12b may include receiving GTP-U data plane entity 26 and sending GTP-U data plane entity 27. Receiving GTP-U data plane entity 26 includes ingress unknown destination table 28 and ingress known destination table 30. Receiving GTP-U data plane entity 26 has a destination address 40, which may be an IP address or any other descriptor which uniquely identifies receiving GTP-U data plane entity 26. Destination computer 12b is associated with the destination address 40, which may be 10.10.10.10.

FIG. 1 also includes destination computer 12c, which has as destination address 40 the IP address 10.20.20.20. A subscriber uses user equipment ("UE") 13 to communicate with source computer 12a. In this example, a first subscriber uses UE 13a to communicate with source computer 12a via communication network 16b, which may be an IP network and/or a wireless network. Similarly, a second subscriber uses UE 13b to communicate with source computer 12a via communication network 16b. A third subscriber uses UE 13c to communicate with destination computer 12b via communication network 16c, which may also be an IP network and/or a wireless network, and a fourth subscriber uses UE 13d to communicate with destination computer 12b via communication network 16c. UEs 13a, 13b, 13c and 13d may be any computing device that may receive and forward data, such as a computer, a router, a server, a mobile device, a tablet, a laptop, etc. A UE 13 may be associated with one or more bearer connections 31 between source computer 12a and destination computer 12b.

In the exemplary embodiment shown in FIG. 1, there are three bearer connections 31a, 31b and 31c between source computer 12a and destination computer 12b. A first bearer connection 31a includes a first tunnel 33a identified with destination identifier 36, e.g., TEID, "0x01FFFFFF." A second bearer connection 31b includes a second tunnel 33b with a value of destination identifier 36 "0x01FF21FF." Sending GTP-U data plane entity 18 uses first bearer connection 33a to send packets received from UE 13a to receiving GTP-U data plane entity 26; and second bearer connection 33b to send packets received from UE 13b to receiving GTP-U data plane entity 26. A third bearer connection 31c includes third tunnel 33c with destination identifier zero "0". Third tunnel 33c is used by sending GTP-U data plane entity 27 to send error indication messages 54 and 58 (shown in FIGS. 6 and 7) to receiving GTP-U data plane entity 19.

Each bearer connection 31 is associated with a subscriber's UE 13. For example, bearer connection 31a may correspond to UE 13a, and bearer connection 31b may correspond to UE 13b. A bearer connection 31 may include one tunnel 33 or a pair of tunnels 33. For instance, bearer 31 may include a single tunnel 33, which may be an outgoing or an incoming tunnel 33. A bearer connection 31 may have a single pair of tunnels 33 (outgoing and incoming). In the present invention, when a faulty outgoing tunnel 33 is detected, the bearer 31 that includes the faulty tunnel 33 is removed from egress destination table 24 in source computer 12a. If the bearer 31 is bi-directional, i.e., bearer 31 also includes an incoming tunnel 33, incoming tunnel 33 is also removed from ingress known destination table 30 in destination computer 12b. As such, two tables are updated, egress destination table 24 in source computer 12a and ingress known destination table 30 in destination computer 12b when bearer 31 is released.

A subscriber has the option to setup multiple bearers, e.g., two to eight bearers 31. Each different bearer connection 31 may include a tunnel 33, and each tunnel 33 has a different destination identifier 36, i.e., TEID. For example, one bearer 31 may be used to send voice data to a subscriber's UE 13, another bearer 31 may be used to send video data to the UE 13, and yet another bearer 31 may be used to send email data. Even though only three bearer connections 31 each including a single tunnel 33 are shown, the invention is not limited to such. There may be any number of bearer connections between source computer 12a and destination computer 12b.

Communication networks 16a, 16b and 16b (herein in after referred as communication network 16) may include a cellular communication network such as a GPRS network, an LTE network and the Public Switched Telephone Network (PSTN), or other wide area network (WAN), such as the Internet, as well as local area networks (LANs), such as an Ethernet LAN. Communication networks 16, 17a and 17b may be a wireless network, such as Wi-Fi, satellite, infrared, Bluetooth, Near Field Communications, or other communication network, such as an optical communication network.

In an exemplary embodiment, UE 13a may wish to communicate with UE 13c. UE 13a sends a packet to source computer 12a via communication network 16b. Source computer 12a encapsulates the packet and creates user data packet 34 (shown in FIG. 2), which includes as payload 44 the original packet received. Source computer 12a sends user data packet 34 to destination computer 12b via communication network 16a using bearer connection 31a which corresponds to UE 13a. Destination computer 12b receives user data packet 34 including destination identifier 36, which in this case is "0x01FFFFFF." Destination computer 12b looks up destination identifier 36 in ingress known destination table 30. If ingress known destination table 30 does not include destination identifier 36, destination computer 12b determines that destination identifier 36 in user data packet 34 is unknown and stores destination identifier 36 in association with source address 38 in ingress unknown destination table 28 (shown in FIG. 3). Destination computer 12b starts a first transmission timer 48.

If destination computer 12b receives another user data packet 34 after first transmission timer 48 expires, destination computer 12b sends a first error indication message 54 (shown in FIG. 6) to source computer 12a and starts a retransmission timer 50 (shown in FIG. 3). Receiving GTP-U data plane entity 19 receives first error indication message 54 and communicates the first error indication message 54 to sending GTP-U data plane entity 18. Sending GTP-U data plane entity 18 determines whether an entry including destination identifier 36 and destination address 40 exists in egress destination table 24. If an entry including destination identifier 36 and destination address 40 exists in egress destination table 24, sending GTP-U data plane entity 18 sends release notification message 32 to control module/GTP-U control plane entity 20. Release notification message 32 triggers the release of a bearer 31a connection associated with the destination identifier 36 "0x01FFFFFF." GTP-U control plane entity 20 receives error notification message 32 and releases bearer 31a associated with the faulty destination identifier 36, but does not release other bearers 31 associated with the subscriber, e.g., UE 13a. If an entry including destination identifier 36 and destination address 40 does not exist in egress destination table 24, then sending GTP-U data plane entity 18 ignores error indication message 54.

FIG. 2 is a block diagram of exemplary user data packet 34, which may be a G-PDU. User data packet 34 includes source address 38 of source computer 12a sending user data packet 34, destination address 40 of destination computer 12b, destination identifier 36, and user payload 44. Source address 38 may be the IP address of source computer 12a, and destination address 40 may be the IP address of remote destination computer 12b. Destination identifier 36 may be a TEID, label, tag, mark, token or any other description which uniquely identifies a destination of user data packet 34. Destination identifier 36 identifies a tunnel 33 that source computer 12a uses to send user data packet 34 to destination computer 12b. In one embodiment, the TEID may have a value that is not equal to zero, as zero may be used to indicate special control and system messages.

User payload 44 includes user data as opposed to control information included in system data packets. User payload 44 may include data from a user, such as a username, password, data in an email, etc. User payload 44 includes the data bits delivered from/to the user. User payload 44 may not include the overhead data required to get user data packet 34 to its destination.

FIG. 3 is a block diagram of an exemplary ingress unknown destination table 28. Ingress unknown destination table 28 may include entries such as unknown destination identifier 36 and its associated source address 38, error indication sent flag 46, first transmission timer 48 and retransmission timer 50. Exemplary ingress unknown destination table 28 shown in FIG. 3 includes three rows. The first row includes as unknown destination identifier 36 TEID "0xABABABAB," which is associated with source address "10.1.2.3," i.e., ingress unknown destination table 28 indicates that destination computer 12b received a user data packet 34 from a computer (not shown) with source address 38 "10.1.2.3" that was destined to destination "0xABABABAB," i.e., user data packet 34 included as destination identifier 36 the value of "0xABABABAB." Since destination computer 12b did not know destination "0xABABABAB," destination computer 12b stored destination identifier 36 in association with source address 38 in ingress unknown destination table 28.

Of note, ingress known destination table 30, egress destination table 24 and ingress unknown destination table 28 are not limited to the number of entries or sizes shown in FIGS. 1 and 3-5. Egress destination table 24, ingress known destination table 30, and ingress unknown destination table 28 may have any number of entries and may be of any size subject to the memory capacity of computers 12. Further, ingress known destination table 30, egress destination table 24 and ingress unknown destination table 28 may be implemented using different data structures such as hashes, matrices, two or three dimensional arrays, databases, linked lists, trees, etc.

Exemplary ingress unknown destination table 28 further indicates that destination computer 12b with source address 10.10.10.10 received a user data packet 34 from source address 38 "10.1.2.9," corresponding to source computer 12a, which included unknown destination identifier 36 the value "0x01FFFFFF," and a user data packet 34 from a computer (not shown) with source address 38 "10.1.2.8" which included as destination identifier 36 the value "0x03FF01FF."

Since destination computer 12b also did not know destination identifiers 36 "0x01FFFFFF" and "0x03FF01FF," destination computer 12b stored both destination identifiers 36 and their corresponding source addresses 38 in ingress unknown destination table 28. Ingress unknown destination table 28 may be a secondary table, such as an unknown tunnel/TEID table, used by destination computer 12b to delay or avoid transmission of a first error indication message 54 and pace the transmission of subsequent error indication messages 58.

Error indication sent flag 46 may be an indicator which indicates to destination computer 12b whether destination computer 12b sent an error indication message 54 (shown in FIG. 6) to source computer 12a. As such, error indication sent flag 46 indicates whether the first error indication message 54 for the received unknown user data packet 34 has been transmitted by sending GTP-U data plane entity 27 to source computer 12a. In an exemplary embodiment, error indication sent flag 46 may have two possible values: true (1) or false (0).

First transmission timer 48 may be an indicator which indicates to destination computer 12b whether it is time to send first error indication message 54 to source computer 12a after receiving an unknown user data packet 34. First transmission timer 48 may indicate that enough time has already passed after receiving an unknown user data packet 34, and that first error indication message 54 can be sent to source computer 12a once a subsequent user data packet 34 is received after the first transmission timer 48 has expired. First transmission timer 48 may specify how long destination computer 12b waits before transmitting first error indication message 54 to source computer 12a for a given unknown G-PDU, e.g., user data packet 34, which may include unknown destination identifier 36 and source address 38, e.g., a receive TEID and source address 38 pair.

First transmission timer 48 may be configurable to, for example, wait for one second and then proceed to determine if a subsequent user data packet 34 is received. If a subsequent user data packet 34 is received after first transmission timer 48 expires, then destination computer 12b sends a first error indication message 54. Exemplary ingress unknown destination table 28 shows two first transmission timers 48 that have expired and one that has started. If no subsequent user data packets 34 are received after first transmission timer 48 has expired, then destination computer 12b does not send any error indication messages 54 or 58.

Retransmission timer 50 may be an indicator that indicates to destination computer 12b whether it is time to transmit a subsequent error indication message 58 (shown in FIG. 7) to source computer 12a after first error indication message 54 has been transmitted. Retransmission timer 50 may be used to pace the transmission of subsequent error indication messages 58 in response to receiving subsequent user data packets 34 that include the same source address 38 and destination identifier 36 as the first user data packet 34 that caused first error indication message 54 to be transmitted. Exemplary ingress unknown destination table 28 shows a retransmission timer 50 that has not expired and two that have not been started.

Retransmission timer 50 may indicate a number of seconds (or any other time unit) that destination computer 12b waits before sending GTP-U data plane entity 27 transmits subsequent error indication message 58 in response to a subsequent received user data packet 34 that includes the same source address 38 and destination identifier 36. Retransmission timer 50 may be user configurable. For example, retransmission timer 50 may be set to ten seconds, so that destination computer 12b waits at least ten seconds after sending the first error indication message 54 to retransmit subsequent error indication message 58 if a subsequent user data packets 34 with the same destination identifier 36 and source address 38 have been received after retransmission timer 50 has expired. If retransmission timer 50 expires and no subsequent user data packets 34 are received after retransmission timer 50 has expired, then destination computer 12b does not send any subsequent error indication messages 58.

Retransmission timer 50 may be a variable timer that may use an exponential algorithm, where the value set for retransmission timer 50 may be the initial retransmission value. By way of example, if retransmission timer 50 is set to one second, receiving GTP-U data plane entity 26 may send subsequent error indication messages 58 at one second, two seconds, four seconds, eight seconds, sixteen seconds, etc.

FIG. 4 is a block diagram of an exemplary ingress known destination table 30. Ingress known destination table 30 may be a primary table used by destination computer 12b to determine how to route user data packet 34. Ingress known destination table 30 may include a list of known destination identifiers 36. Exemplary ingress known destination table 30 includes destination identifiers 36 that are known to receiving GTP-U data plane entity 26. As an example, ingress known destination table 30 includes destination identifier 0x01FF21FF corresponding to tunnel 33b of bearer connection 31b. Bearer connection 31b is associated with UE 13b. Ingress known destination table 30 includes known destination identifiers 36 which destination computer 12b or receiving GTP-U data plane entity 26 considers to be valid.

FIG. 5 is a block diagram of an exemplary egress destination table 24 stored in source computer 12a. Egress destination table 24 may include entries such as known destination identifier 36 and destination address 40. Exemplary egress destination table 24 includes the destination addresses 40 which source computer 12a recognizes as valid addresses to which user data packets 34 can be transmitted. Each destination address 40 is associated with a corresponding known destination identifier 36, which is the destination of user data packet 34. Exemplary egress destination table 24 includes known destination identifier 36 "0x01FAFFEF" associated with destination address 40 "10.20.20.20" of destination computer 12c, known destination identifier 36 "0x01FF21FF" associated with destination address "10.10.10.10" of destination computer 12b, and known destination identifier 36 "0x01FFFFFF" associated with destination address 40 "10.10.10.10" of destination computer 12b. Known destination identifier 36 "0x01FFFFFF" associated with tunnel 33a is used to send user data packets 34 corresponding to UE 13a. Known destination identifier 36 "0x01FF21FF" associated with tunnel 33b is used to send user data packets 34 corresponding to UE 13b. As such, egress destination table 24 includes pairs of destination addresses 40 and known destination identifiers 36 which source computer 12a or sending GTP-U data plane entity 18 considers to be valid.

Egress destination table 24 also includes error indication received flag 52. Error indication received flag 52 may indicate whether a first error indication message 54 was received. First error indication message 54 includes in information element 56 (shown in FIG. 6) known destination identifier 36 and destination address 40 of the original user data packet 34 sent by source computer 12a. When source computer 12a receives first error indication message 54 indicating that destination identifier 36 is unknown, source computer 12a determines whether egress destination table 24 includes destination identifier 36 and destination address 40 pair. Source computer 12a also checks whether destination address 40 included in information element 56 is the destination address 40 of destination computer 12b, i.e., the destination computer 12b that received the user data packet 34 which caused destination computer 12b to send first error indication message 54.

FIG. 6 is a block diagram of an exemplary first error indication message 54. First error indication message 54 may include source address 39, which corresponds to the address of the computer that sent the first error indication message 54 to source computer 12a. In this case, source address 39 is the IP address "10.10.10.10" of destination computer 12b. First error indication message 54 also includes destination address 41, which corresponds to the address of the computer that receives first error indication message 54. In this example, destination address 41 is the IP address of source computer 12a. First error indication message 54 further includes information element 56, which may be a TEID I information element. Information element 56 may include information associated with the user data packet 34 that caused the transmission of first error indication message 54, such as for example, the destination address 40 of the user data packet 34 and unknown destination identifier 36 included in user data packet 34. Destination identifier 36 included in information element 56 may be a TEID which is not equal to zero, since TEID zero may be reserved for special messages.

FIG. 7 is a block diagram of an exemplary subsequent error indication message 58 sent after first error indication message 54 has been transmitted to source computer 12a. Subsequent error indication message 58 may be identical to first error indication message 54. Subsequent error indication message 58 is transmitted to source computer 12a when a subsequent user data packet 34 is received by destination computer 12b after retransmission timer 50 has expired.

Figure 8:
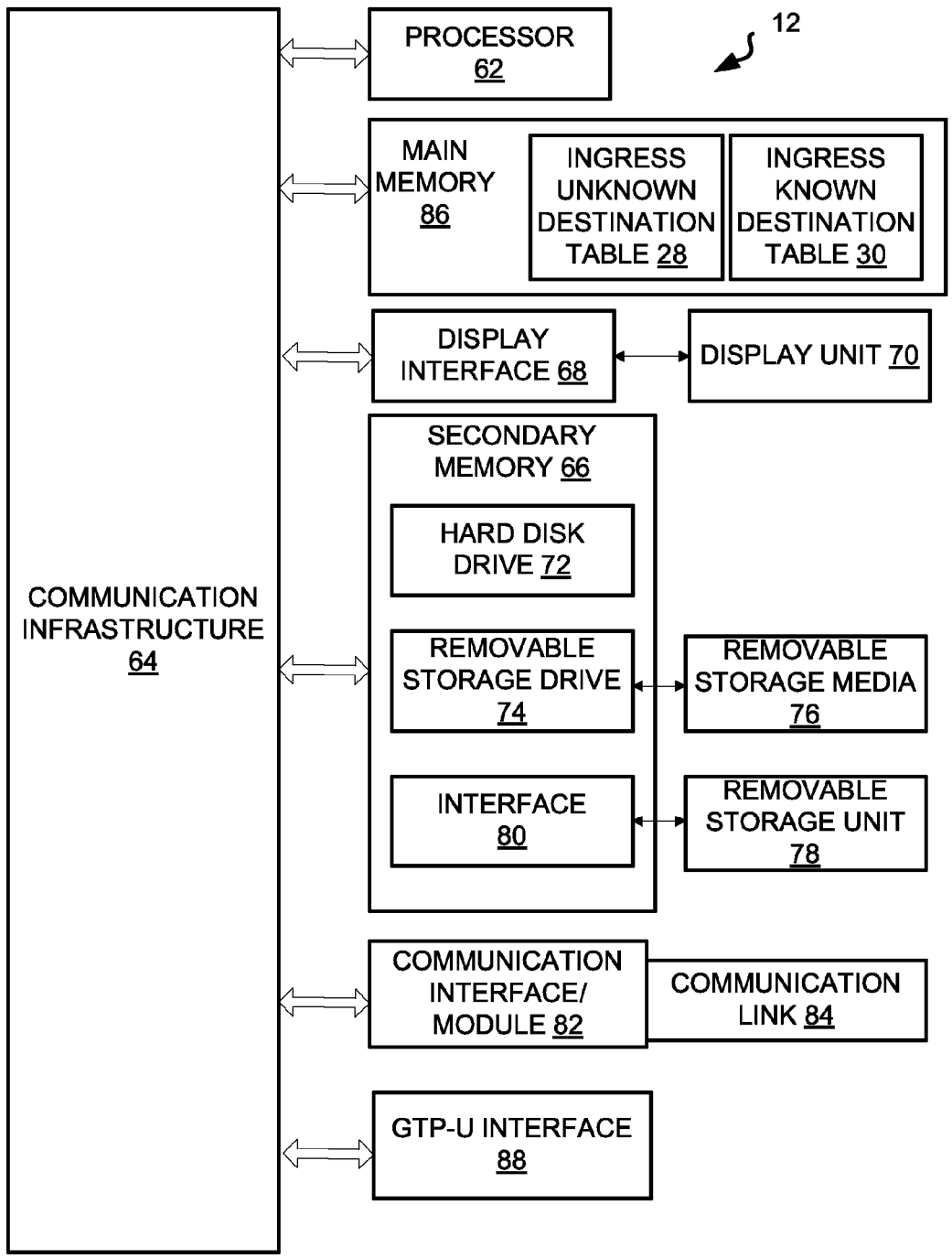
FIG. 8 is a block diagram of an exemplary computer in accordance with the principles of the present invention.

FIG. 8 is a block diagram of an exemplary computer 12 which may be used to implement source computer 12a and/or destination computer 12b. Computer 12 may be a GTP-U node that performs lookup of mapping entries in tables, such as egress destination table 24, ingress unknown destination table 28 and ingress known destination table 30, for each inbound and outbound user data packet 34. Computer 12 includes one or more processors, such as processor 62, programmed to perform the functions described herein. Processor 62 is operatively coupled to a communication infrastructure 64, e.g., a communications bus, cross-bar interconnect, network, etc. Processor 62 may execute computer programs stored on disk storage for execution via secondary memory 66. Computer 12 may optionally include or share a display interface 68 that forwards graphics, text, and other data from the communication infrastructure 64 (or from a frame buffer not shown) for display on the display unit 70. Display unit 70 may be a cathode ray tube (CRT) display, a liquid crystal display (LCD), light-emitting diode (LED) display or touch screen display, among other types of displays.

Secondary memory 66 may include, for example, a hard disk drive 72 and/or a removable storage drive 74, representing a removable hard disk drive, magnetic tape drive, an optical disk drive, etc. The removable storage drive 74 reads from and/or writes to a removable storage media 76 in a manner well known to those having ordinary skill in the art. Removable storage media 76, represents, for example, a floppy disk, external hard disk, magnetic tape, optical disk, etc. which is read by and written to by removable storage drive 74. As will be appreciated, the removable storage media 76 includes a computer usable storage medium having stored therein computer software and/or data.

In alternative embodiments, secondary memory 66 may include other similar devices for allowing computer programs or other instructions to be loaded into the computer system and for storing data. Such devices may include, for example, a removable storage unit 78 and an interface 80. Examples of such may include a program cartridge and cartridge interface (such as that found in video game devices), flash memory, a removable memory chip (such as an EPROM, EEPROM or PROM) and associated socket, and other removable storage units 78 and interfaces 80 which allow software and data to be transferred from the removable storage unit 78 to other devices.

Computer 12 also includes a communications interface 82. Communications interface 82 allows software and data to be transferred to external devices. Examples of communications interface 82 may include a modem, a network interface (such as an Ethernet card), a communications port, a PCMCIA slot and card, wireless transceiver/antenna, etc. Software and data transferred via communications interface/module 82 may be, for example, electronic, electromagnetic, optical, or other signals capable of being received by communications interface 82. These signals are provided to communications interface 82 via the communications link (i.e., channel) 84. Channel 84 carries signals and may be implemented using wire or cable, fiber optics, a phone line, a cellular phone link, an RF link, and/or other communications channels. The computer system also includes a main memory 86, such as random access memory ("RAM") and read only memory ("ROM"). Main memory 86 may store egress destination table 24, ingress unknown destination table 28 and ingress known destination table 30.

It is understood that computer 12 may have more than one set of communication interface 82 and communication link 84. For example, computer 12 may have a communication interface 82/communication link 84 pair to establish a communication zone for wireless communication, a second communication interface 82/communication link 84 pair for low speed, e.g., WLAN, wireless communication, another communication interface 82/communication link 84 pair for communication with optical networks, and still another communication interface 82/communication link 84 pair for other communication.

Computer 12 may include one or more GTP-U interfaces 88. Each GTP-U interface 88 is assigned an address or identifier, such as an IP address. Each GTP-U interface 88 can act as a sending GTP-U data plane entity 18, sending GTP-U data plane entity 27, receiving GTP-U data plane entity 19 or receiving GTP-U data plane entity 26, or both a receiving and sending GTP-U data plane entity at the same time. GTP-U interface 88 communicates with another GTP-U interface. For example a GTP-U interface associated with source computer 12a can communicate with a GTP-U interface associated with destination computer 12b. Computer programs, also called computer control logic, are stored in main memory 86 and/or secondary memory 66. For example, computer programs are stored on disk storage, i.e. secondary memory 66, for execution by processor 62 via RAM, i.e. main memory 86. Computer programs may also be received via communications interface 82. Such computer programs, when executed, enable the method and system to perform the features of the present invention as discussed herein. In particular, the computer programs, when executed, enable processor 62 to perform the features of the corresponding method and system. Accordingly, such computer programs represent controllers of the corresponding device.

Computer 12 functionality may be provided by a single computer or distributed among multiple computing devices. As such, computer 12 functionality may be performed by several computing devices that may be located in the same general location or different locations, e.g., cloud computing. In other words, each computing device may perform one or more particular sub-processes of computer 12, and may communicate with each other via, for example, communication network 16a. As such, computer 12 may be a system of components, some of which may be virtual, that function collectively to forward packets.

Various software embodiments are described in terms of exemplary computer 12. It is understood that computer systems and/or computer architectures other than those specifically described herein can be used to implement the invention. It is also understood that the capacities and quantities of the components of the architecture described above may vary depending on the device, the quantity of devices to be supported, as well as the intended interaction with the device. For example, configuration and management of computer 12 may be designed to occur remotely by web browser. In such case, the inclusion of display interface 68 and display unit 70 may not be required.

Figure 9:
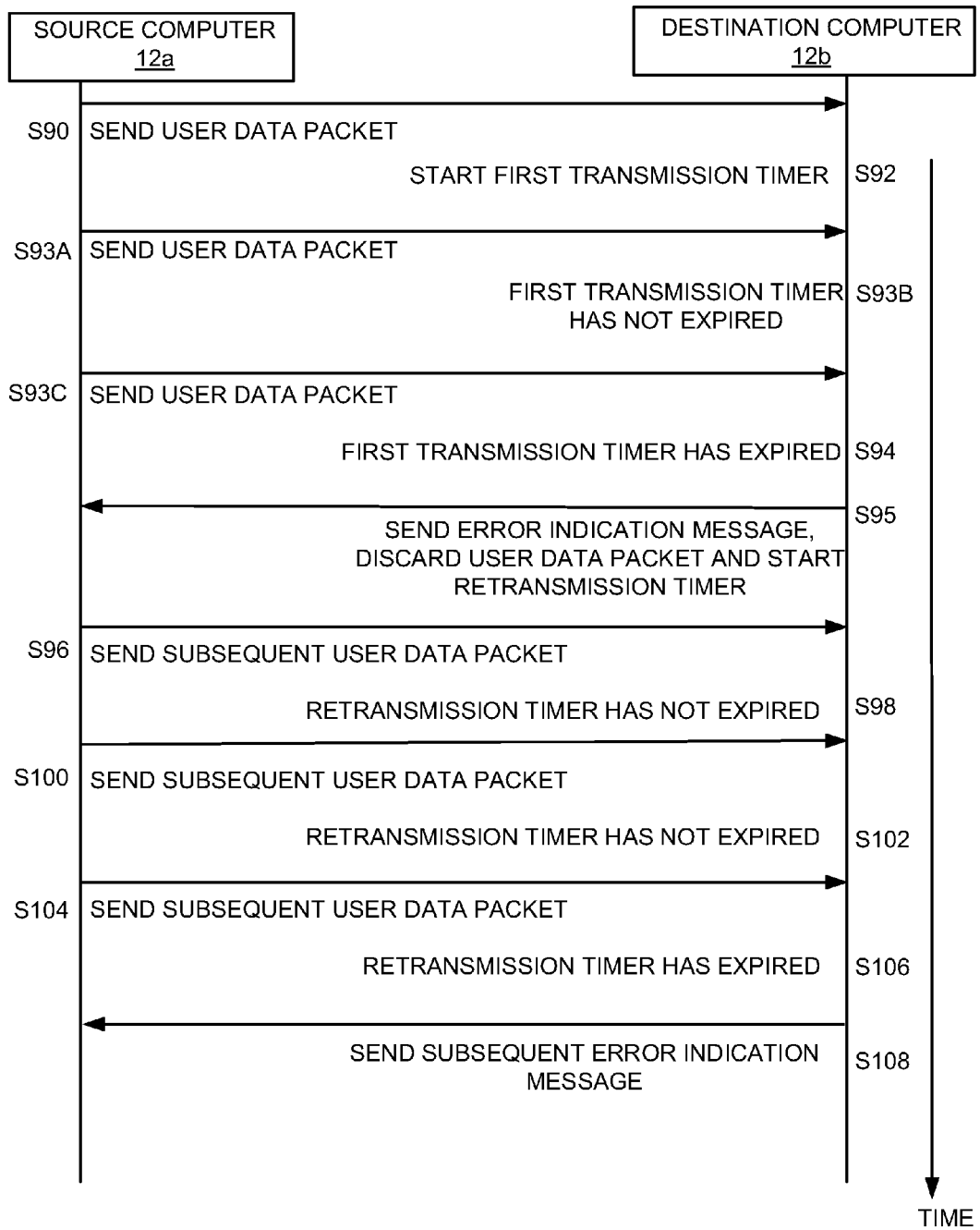
FIG. 9 is a block diagram of an exemplary process for sending an error indication message in accordance with the principles of the present invention.

An exemplary block diagram of an exemplary process for sending user data packet 34 and receiving error indication messages 54 is described with reference to FIG. 9. Source computer 12a sends to destination computer 12b user data packet 34 (Step S90). User data packet 34 includes source address 38, destination address 40, destination identifier 36 and user payload 44. In this example, destination computer 12b determines that it cannot send user data packet 34 to the destination associated with destination identifier 36, i.e., destination identifier 36 is unknown to destination computer 12b. Since destination computer 12b determines that it cannot route user data packet 34, destination computer 12b starts first transmission timer 48 (Step S92) which indicates how long destination computer 12b waits before sending error indication message 54 to source computer 12a in response to receiving one or more subsequent user data packet 34 after first transmission timer 48 expires.

As such, destination computer 12b does not send a first error indication message 54 immediately after receipt of user data packet 34. Instead, destination computer 12b waits before transmitting first error indication message 54, e.g., delays transmission of first error indication message 54, by at least a predetermined time defined by first transmission timer 48. Of note, the transmission of first error indication message 54 may not be necessary if destination computer 12b does not receive any more unknown user data packets 34 after first transmission timer 48 expires.

In addition to starting first transmission timer 48, destination computer 12b adds an entry to ingress unknown destination table 28 that includes destination identifier 36, source address 38, error indication sent flag 46, first transmission timer 48 and retransmission timer 50. Receiving GTP-U data plane entity 26 sets error indication sent flag 46 to indicate that first error indication message 54 has not yet been sent to sending GTP-U data plane entity 18, e.g., sets error indication sent flag 46 to false. Source computer 12a sends a subsequent user data packet 34 (Step S93A). Destination computer 12b determines whether first transmission timer 48 has expired. In this example, destination computer 12b determines that first transmission timer 48 (in ingress unknown destination table 28) associated with the destination identifier 36 and source address 38 of subsequent user data packet 34 has not expired (Step S93B). Therefore, destination computer 12b does not send first error indication message 54.

Source computer 12a sends subsequent user data packet 34 (Step S93C). Again, destination computer 12 determines whether first transmission timer 48 expired. In this example, destination computer 12b determines that first transmission timer 48 has expired (Step S94). Once first transmission timer 48 expires, destination computer 12b sends a first error indication message 54 to source computer 12a and discards user data packet 34 (Step S95). Destination computer 12b also starts retransmission timer 50 (Step S95) and sets error indication sent flag associated with unknown destination identifier 36, e.g., 0x01FFFFFF, and the source address 38, e.g., 10.1.2.9, to true, since first error indication message 54 has been sent.

If destination computer 12b receives a subsequent user data packet 34 from source computer 12a including the same destination identifier 36 and source address 38 pair before destination computer 12b sends the first error indication message 54, then destination computer 12b discards the subsequent user data packet 34 and does not send first error indication message 54. Destination computer 12b paces the transmission of subsequent error indication messages 58. Of note, transmission of subsequent error indication message 58 may not be necessary if destination computer 12b does not receive any more user data packets 34 after retransmission timer 50 expires, where the user data packets 34 include the unknown destination identifier 36.

If after destination computer 12b sends first error indication message 54, source computer 12a sends a subsequent user data packet 34 to destination computer 12b (Step S96), where the subsequent user data packet 34 includes the same source address 38 and same destination identifier 36 as the first transmitted user data packet 34, then destination computer 12b determines whether retransmission timer 50 has expired. In this case, retransmission timer 50 has not expired (Step S98). Since retransmission timer 50 has not expired, destination computer 12b does not sent a subsequent error indication message 58.

Source computer 12a sends a subsequent user data packet 34 (Step S100). Destination computer 12b again checks whether retransmission timer 50 has expired (Step S102). Since retransmission timer 50 has not expired, destination computer 12b does not send a subsequent error indication message 58. Source computer 12a sends yet another subsequent user data packet 34 (Step S104). Destination computer 12b determines whether retransmission timer 50 has expired. In this case, destination computer 12b determines that retransmission timer 50 has expired (Step S106), which indicates that, if a subsequent user data packet 34 is received after retransmission timer has expired, then it is time to send a subsequent error indication message 58 (S108).

Figure 10:
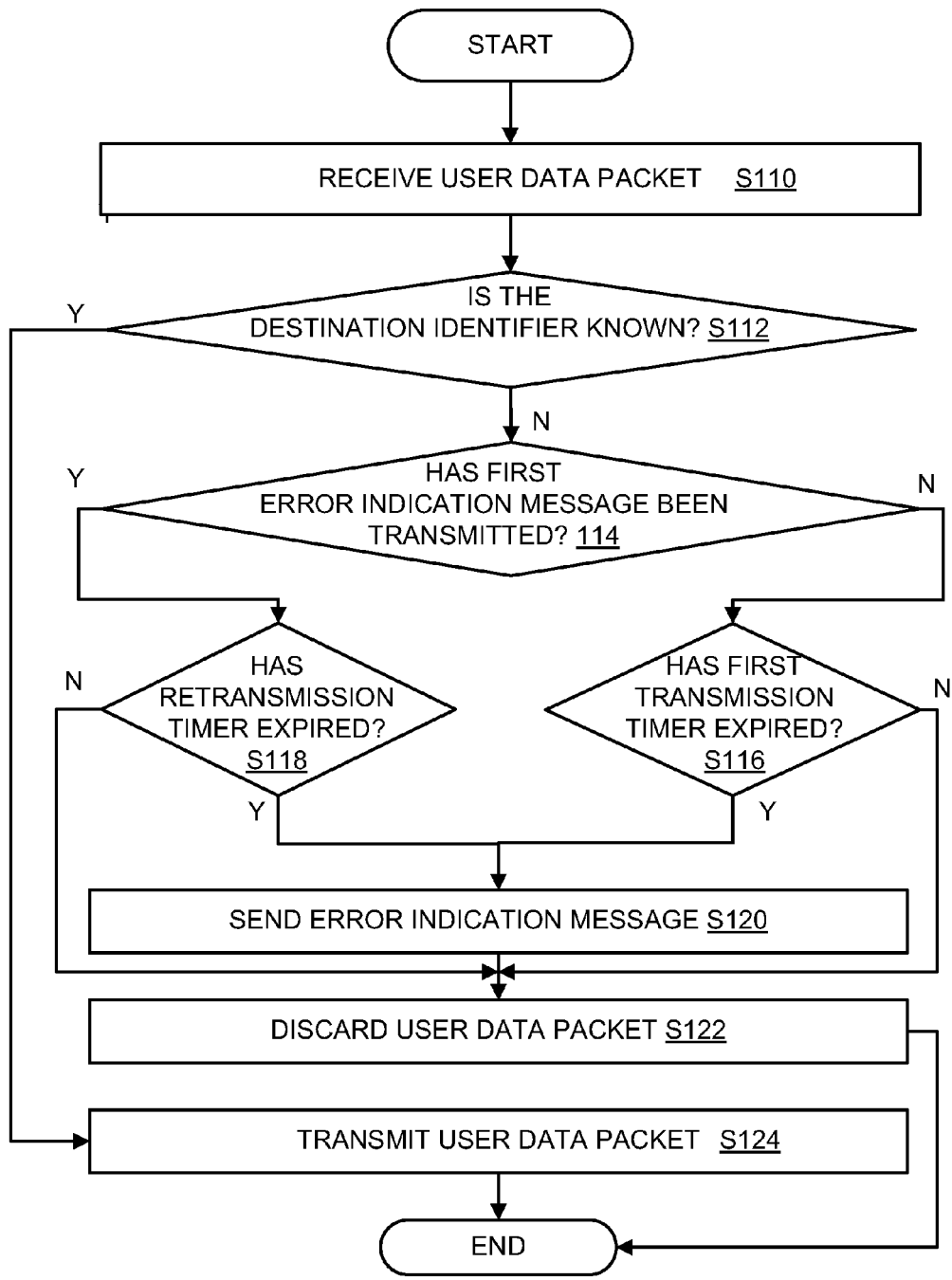
FIG. 10 is a flowchart of an exemplary process for handling transmission of an error indication message in accordance with the principles of the present invention.

FIG. 10 is an exemplary flowchart of a method for handling transmission of error indication messages 54. In this exemplary embodiment, GTP-U data plane entity 18 in source computer 12a sends a GTP-U user data packet 34 to destination computer 12b. Receiving GTP-U data plane entity 26 of destination computer 12b receives user data packet 34 from source computer 12a (Step S110). Receiving GTP-U data plane entity 26 in destination computer 12b analyzes user data packet 34, which may be a GTP-U user message. Destination computer 12b performs a lookup in ingress known destination table 30 for destination identifier 36 to determine if user data packet 34 contains a valid and known receive destination identifier 36 (e.g., receive TEID) from a valid and known sending GTP-U data plane entity 18 (Step S112).

If destination computer 12b determines that destination identifier 36 associated with source address 38 is known, i.e., ingress known destination table 30 includes destination identifier 36, then destination computer 12b transmits user data packet 34 to a destination associated with destination identifier 36 (Step S 124). Else, if receiving GTP-U data plane entity 26 determines that destination identifier 36 is unknown, i.e., ingress known destination table 30 does not include destination identifier 36, then destination computer 12b delays the transmission of the first error indication message 54 to source computer 12a and paces the transmission of subsequent error indication messages 58 if subsequent user data packets 34 are received from source computer 12a, where the subsequent user data packets 34 include the same unknown destination identifier 36. A destination identifier 36 is unknown when, for example, no EPS bearer context or RAB exists.

As such, if destination identifier 36 is unknown, then a determination is made as to whether a first error indication message has been transmitted to source computer 12a (Step S114). If a first error indication message 54 has not been transmitted, a determination is made as to whether first transmission timer 48 has expired (Step S116). If it has not expired, user data packet 34 is discarded (Step S122). Else, it first transmission timer 48 is expired, then destination computer 12b sends first error indication message 54 (Step S120) and discards user data packet 34 (Step S122).

However, if a first error indication message 54 has been transmitted (step S114), a determination is made as to whether retransmission timer 50 has expired (Step S118). If retransmission timer 50 has not expired, then user data packet 34 is discarded (Step S122). Else, if retransmission timer 50 has expired, then a subsequent error indication message 58 is transmitted to source computer 12a (Step S120) and the user data packet 34 is discarded (Step S122).

For example, when destination computer 12b cannot find exemplary destination identifier 36 "0x01FFFFFF" in ingress known destination table 30, destination computer 12b determines that destination identifier 36, e.g., the receive TEID, is unknown. Since receiving GTP-U data plane entity 26 has no knowledge of destination identifier 36, receiving GTP-U data plane entity 26 checks ingress unknown destination table 28 to determine whether ingress unknown destination table 30 includes destination identifier 36. Receiving GTP-U data plane entity 26 determines whether ingress unknown destination table 28 includes an entry corresponding to the unknown destination identifier 36 in association with source address 38.

If destination computer 12b determines that ingress unknown destination table 28 does not have an entry that includes both source address 38 and destination identifier 36, e.g., ingress unknown destination table 28 does not include the unknown destination identifier 36 in association with source address 38, then receiving GTP-U data plane entity 26 adds an entry to ingress unknown destination table 28. The added entry includes a description of the unknown destination identifier 36 (such as a description of the unknown tunnel 33a) and source address 38. For example, destination computer 12b stores in ingress unknown destination table 28 the unknown destination identifier 36, which may be a TEID, in association with source address 38, which may be an IP address of source computer 12a.

Each entry in ingress unknown destination table 28 includes a source address 38 of the sending GTP-U data plane entity 18 and a destination identifier 36, such as the receive TEID fetched from user data packet 34. The entry may also include other information, such as an error indication sent flag 46. Receiving GTP-U data plane entity 26, in addition to storing source address 38 in association with destination identifier 36, stores error indication sent flag 46 in ingress unknown destination table 28 and sets error indication sent flag 46 to false ('0'), since receiving GTP-U data plane entity 26 has not yet sent first error indication message 54 to source computer 12a in response to receiving the "0x01FFFFFF" unknown destination identifier 36.

Receiving GTP-U data plane entity 26 further starts first transmission timer 48 associated with source address 38 and unknown destination identifier 36. First transmission timer 48 defines a predetermined time, such as a number of seconds (or any other time unit) to delay transmission of first error indication message 54 to source computer 12a. Receiving GTP-U data plane entity 26 silently discards user data packet 34.

Source computer 12a sends another user data packet 34 to destination computer 12b. Destination computer 12b determines whether user data packet 34 includes a known or unknown destination identifier 36. If destination computer 12b determines that ingress unknown destination table 28 includes unknown destination identifier 36 in association with source address 38, i.e., as part of the same entry in ingress unknown destination table 28, then receiving GTP-U data plane entity 26 determines whether the transmission of the first error indication message 54 has been delayed for the predetermined amount of time. For example, destination computer 12b may determine whether first transmission timer 48 associated with the unknown pair, i.e., unknown destination identifier 36 and source address 38, has expired.

If first transmission timer 48 has not expired, receiving GTP-U data plane entity 26 determines that the transmission of the first error indication message 54 has not been delayed for the predetermined amount of time and silently discards user data packet 34. If destination computer 12b determines that first transmission timer 48 has expired, i.e., that the transmission of the first error indication message 54 has been delayed for the predetermined amount of time, destination computer 12b sends first error indication message 54, starts retransmission timer 50 and discards user data packet 34. Retransmission timer 50 defines a retransmission time to delay transmission of a subsequent error indication message 58 if a subsequent user data packet 34 received from source computer 12a after retransmission timer 50 has expired includes the same unknown destination identifier 36.

In another exemplary embodiment, pacing the transmission of subsequent error indication messages 58 includes determining that first error indication message 54 has been transmitted. Destination computer 12b delays transmission of subsequent error indication messages 58 in response to receiving subsequent user data packets 34 that include the same unknown destination identifier 36 from the same source computer 12a. For example, destination computer 12b receives, from source computer 12a, a subsequent user data packet 34 that includes the same unknown destination identifier 36. GTP-U data plane entity 26 determines whether error indication sent flag 46 indicates that first error indication message 54 was sent to source computer 12a.

If receiving GTP-U data plane entity 26 determines that the first error indication message 54 has been transmitted, i.e., error indication sent flag 46 is set to true, destination computer 12b determines whether it is time to send a subsequent error indication message 58. Destination computer 12b checks whether retransmission timer 50 has expired. If destination computer 12b determines that retransmission timer 50 has not expired, then receiving GTP-U data plane entity 26 silently discards the subsequent received user data packet 34.

If receiving GTP-U data plane entity 26 determines that first transmission timer 48 has expired and that the error indication sent flag 46 is set to true, sending GTP-U data plane entity 27 sends a subsequent error indication message 58 to receiving GTP-U data plane entity 19, and destination computer 12b discards user data packet 34. Destination computer 12b also resets retransmission timer 50.

In another exemplary embodiment, memory space allocated for each entry in ingress unknown destination table 28 may be reclaimed in different ways. For example, an entry in ingress unknown destination table 28 may be reclaimed after a predetermined number of subsequent error indication messages 58 have been transmitted. This may periodically delete older entries and may allow new entries to be added to ingress unknown destination table 28. As another example, an entry may be deleted by receiving GTP-U data plane entity 26 after a predetermined time passes. Receiving GTP-U data plane entity 26 may keep an entry timer for each entry in ingress unknown destination table 28.

The entry timer may be user-configurable and may start when an entry becomes inactive, i.e., when receiving GTP-U data plane entity 26 has stopped receiving user data packets 34 that include the same source address 38 and unknown destination identifier 36 pair, which are the same as the source address 38 and unknown destination identifier 36 pair in the entry to be deleted. The inactive entry may be deleted after a predetermined time, e.g., a number of seconds, has passed without receiving GTP-U data plane entity 26 receiving a user data packet 34 that includes the source address 38 and destination identifier 36 pair stored in the entry.

The entry timer may also be started when an entry is added to ingress unknown destination table 28. The entry timer may be configured to last longer than first transmission timer 48, such as for example sixty seconds, as opposed to a one second first transmission timer 48. When the entry timer expires, the entry may be removed by receiving GTP-U data plane entity 26, regardless as to whether the entry is active or inactive. This allows receiving GTP-U data plane entity 26 to re-add other entries or the same entry later in time if necessary.

Figure 11:
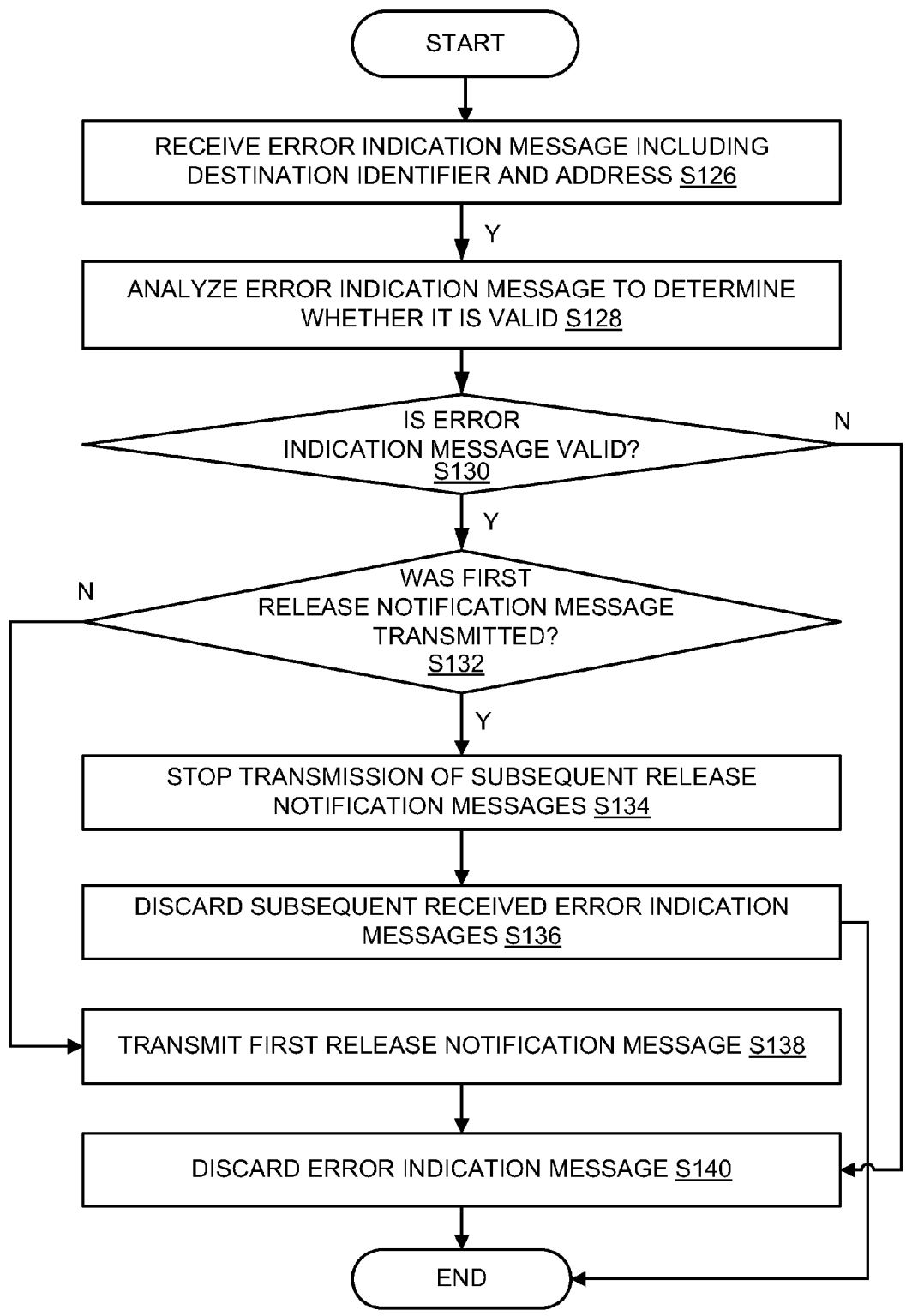
FIG. 11 is a flowchart of an exemplary process for transmitting a release notification message, in accordance with the principles of the present invention.

FIG. 11 is a flowchart of an exemplary process for transmitting a release notification message 32 in response to receiving one or more first error indication messages 54 or subsequent error indication messages 58. In an exemplary embodiment, receiving GTP-U data plane entity 19 receives first error indication message 54 from sending GTP-U data plane entity 27 (Step S126). Receiving GTP-U data plane entity 19 communicates the first error indication message 54 to sending GTP-U data plane entity 18. Sending GTP-U data plane entity 18 determines whether or not to send release notification message 32 to control module/GTP-U control plane entity 20 based on an analysis of first error indication message 54 (Step S128).

Sending GTP-U data plane entity 18 analyzes first error indication message 54 to determine whether it is valid, i.e., whether it is for a bearer 31 connection included in the egress destination table 24 (Step S 128). For example, GTP-U data plane entity 18 may perform a look up in its egress destination table 24 to determine if first error indication message 54 is for a valid and known destination identifier 36, such as a transmit TEID. Source computer 12a determines whether the information element 56 of the first error indication message 54 includes destination identifier 36 and destination address 40 corresponding to a destination identifier 36 and destination address 40 included in a user data packet 34 that sending GTP-U data plane entity 18 actually sent to a valid and known receiving GTP-U data plane entity 26 (e.g., a valid IP address and a valid destination identifier 36 stored in egress destination table 24).

If sending GTP-U data plane entity 18 determines that destination identifier 36 in first error indication message 54 is unknown to sending GTP-U data plane entity 18, i.e., error indication message 54 is invalid as destination identifier 36 in association with destination address 40 cannot be found in egress destination table 24 (Step S130), then source computer 12a discards first error indication message 54 (Step S140) and does not send release notification message 32 to control module/GTP-U control plane entity 20. Further, source computer 12a ignores subsequent received error indication messages 58, e.g., does not transmit any release notification messages 32 to control module/GTP-U control plane entity 20 in response to subsequent received error indication messages 58 that include both the destination identifier 36 and destination address 40 in information element 56.

For example, source computer 12a may determine that a destination identifier 36 is unknown when (i) egress destination table 24 does not include destination identifier 36, which indicates that sending GTP-U data plane entity 18 did not send a user data packet 34 with destination identifier 36 to destination address 40, (ii) egress destination table 24 does not include destination address 40, which indicates that sending GTP-U data plane entity 18 did not send a user data packet 34 to destination address 40. If sending GTP-U data plane entity 18 determines that the destination identifier 36 and destination address 40 pair is unknown, i.e., cannot be found in egress destination table 24, then sending GTP-U data plane entity 18 silently discards the first error indication message 54 and any subsequent error indication messages 58.

Receipt of first error indication message 54 or subsequent error indication messages 58 triggers source computer 12a to delete entries in its egress destination table 24. Any entry deleted includes the pair of destination identifier 36 (found in information element 56 of first error indication message 54) and destination address 40. By having source computer 12a verify that first error indication message 54 or subsequent error indication messages 58 are valid and legitimate messages received in response to source computer 12a sending user data packet 34, source computer 12a ensures that entries of egress destination table 24 are not deleted blindly, as the first error indication message 54 and subsequent error indication messages 58 may be invalid or may be viruses or malicious packets designed to cause source computer 12a to terminate valid tunnels 33 or bearer connections 31.

Further, the receipt of first error indication message 54 or subsequent error indication message 58 by receiving GTP-U data plane entity 19 triggers internal control messages in source computer 12a. For example, sending GTP-U data plane entity 18 sends a release notification message 32 to control module/GTP-U control plane entity 20 in source computer 12a. The release notification message 32 triggers control module/GTP-U control plane entity 20 to release a bearer 31 connection and delete an entry in egress destination table 24 that includes the unknown destination identifier 36 and destination address 40 pair associated with bearer 31.

In an exemplary embodiment, destination computer 12b delays the transmission of error indication message 54 so that GTP-U control plane entity (not shown) in destination computer 12b can send a signaling message to the peer GTP-U control plane entity 20 requesting the release of the bearer 31 connection. The GTP-U control plane entity of destination computer 12b directly or indirectly notifies the peer GTP-U control plane entity 20 that the bearer 31 connection has been released. Delaying transmission of error indication message 54 allows the signaling message to be processed by source computer 12a before source computer 12 receives and processes an error indication message 54. If GTP-U data plane entity 18 determines that destination identifier 36 is known, i.e., an entry including the pair of destination identifier 36 and destination address 40 exists in egress destination table 24, then GTP-U data plane entity 18 determines that the error indication message 54 transmitted from sending GTP-U data plane entity 27 to receiving GTP-U data plane entity 19 is valid (Step 130). A destination identifier 36 and destination 40 address pair is considered valid when sending GTP-U data plane entity 18 verifies that it was sending user data packets 34 with the destination identifier 36 and destination address 40 pair before receiving first error indication message 54.

If source computer 12a determines that destination identifier 36 is known, i.e., valid, and first error indication message 54 was transmitted by a valid sending G-TPU data plane entity 27 (e.g., destination identifier 36 and destination address 40 are stored in egress destination table 24), sending GTP-U data plane entity 18 determines whether the first release notification message 32 has been transmitted to control module 20 (Step S132). Sending GTP-U data plane entity 18 verifies in egress destination table 24 the setting of error indication received flag 52 associated with the entry that includes destination identifier 36 and destination address 40. Error indication received flag 52 indicates if receiving GTP-U data plane entity 19 has received a first error indication message 54 and. in response, has transmitted a release notification message 32, e.g., a faulty tunnel notification message, to GTP-U control plane entity 20.

If error indication received flag 52 indicates that sending GTP-U data plane entity 18 has not received first error indication message 54 and/or has not sent a release notification message 32 to GTP-U control plane entity 20, e.g., error indication received flag 52 is set to false, sending GTP-U data plane entity 18 sends a single first release notification message 32, e.g., a faulty tunnel notification, to GTP-U control plane entity 20 (Step S138). GTP-U control plane entity 20 is responsible for triggering the release of a subscriber bearer connection 31 associated with destination identifier 36 corresponding to tunnel 33. GTP-U control plane entity 20 is also responsible for deleting the entry from egress destination table 24. The transmission of first release notification message 32 may be delayed using similar procedures described for delaying error indication messages 54 and 58.

GTP-U control plane entity 20 may or may not acknowledge the receipt of release notification message 32 to GTP-U data plane entity 18. Alternatively, GTP-U data plane entity 18 may transmit release notification message 32 to GTP-U control plane entity 20 without expecting an acknowledgment from GTP-U control plane entity 20 when the delivery of release notification message 32 is reliable. GTP-U data plane entity 18 sets error indication received flag 52 to true to indicate that GTP-U data plane entity 18 has sent a release notification message 32 to GTP-U control plane entity 20. Further, GTP-U data plane entity 18 discards first error indication message 54 or subsequent error indication message 58 (Step S140).

On the other hand, if error indication received flag 52 indicates that GTP-U data plane entity 18 has sent GTP-U control plane entity 20 a first release notification message 32 for the corresponding destination identifier 36 and destination address 40 (Step S132), e.g., error indication received flag 52 is set to true, sending GTP-U data plane entity 18 does not transmit any subsequent release notification messages (Step S134) and discards/ignores all subsequent received error indication messages 58 that include the same destination identifier 36 and destination address 40 in information element 56 (Step S136). As such, GTP-U data plane entity 18 does not send GTP-U control plane entity 20 any subsequent release notification messages 32, e.g., faulty tunnel notifications, after sending the first release notification message 32. In this way, GTP-U control plane entity 20 will not be overwhelmed processing release notification messages 32 for the same pair of destination identifier 36 and destination address 40.

In another exemplary embodiment, release notification message 32 may be a first faulty tunnel notification sent from a receiving module responsible for receiving first error indication message 54, such as GTP-U data plane entity 18, to control module/GTP-U control plane entity 20 responsible for terminating and releasing a faulty bearer connection 31 associated with destination identifier 36, e.g., a faulty tunnel 33. The receiving module is configured to send a message to the control module 20 informing control module/GTP-U control plane entity 20 that a bearer 31 connection associated with destination identifier 36 may include a bad tunnel 33. The receiving module communicates to control module/GTP-U control plane entity 20 that first error indication message 54 has been received, i.e., indicates to control module/GTP-U control plane entity 20 that a bearer 31 connection associated with destination identifier 36 may not be working.

In another exemplary embodiment, sending GTP-U data plane entity 18 may maintain a sending queue for release notification messages 32, e.g., faulty tunnel notification messages that are scheduled to be sent to GTP-U control plane entity 20. The sending queue can be serviced with a rate transmission controller or traffic shaper in order to spread the number of release notification messages 32 over time. GTP-U control plane entity 20 can also implement a receiving buffer for release notification messages 32 received from GTP-U data plane entity 18.

With the claimed invention, advanced radio features related to subscriber bearer handling, such as the handling of pre-emption, can be deployed without causing unnecessary and undesirable GTP-U data plane entity 18 and GTP-U control plane entity 20 procedures. GTP-U data plane entity 18 and GTP-U control plane entity 20 procedures may have negative consequences on the subscribers and communication network 16.

For example, three bearers 31 may be associated with a subscriber. One of the bearers 31 may include two tunnels 33, one incoming and one outgoing. If destination computer 12*b* determines that incoming tunnel 33 is unknown, then source computer 12*a* will remove both tunnels 33 corresponding to the single faulty bearer, i.e., source computer 12*a* will remove the bearer 31 connection associated with unknown tunnel 33, but will not remove other bearers 31 associated with the same subscriber.

Destination computer 12*b* may have decided to pre-empt, i.e., remove, a tunnel 33 because destination computer 12*b* is running low on resources. Destination computer 12*b* starts GTP-U control plane procedures to inform GTP-U control plane entity 20 of source computer 12*a* that tunnel 33 has been pre-empted, e.g., sends a release signaling indication to inform the sending GTP-U user plane entity 18. While this is happening, in parallel, destination computer 12*b* starts sending error indication messages 54 to source computer 12*a*, given that tunnel 33 is now unknown. An error indication message 54 causes source computer 12*a* to delete all bearer 31 connections of a subscriber associated with a destination identifier 36. As such, a subscriber looses all bearer 31 connections, even bearer 31 connections that include valid tunnels 33. All bearer 31 connections, i.e., all TEIDS, for the UE 13 of the subscriber are deleted, as the error indication message 54 triggers the complete removal of the UE 13 context and all associated bearer 31 connections of UE 13. The subscriber looses connection to the network, forcing the subscriber to reconnect by starting reconnection procedures. Delaying the error indication messages 54 gives source computer 12*a* time to receive the signaling message from destination computer 12*b* and remove just the faulty bearer 31, and not the other bearers 31 associated with the subscriber.

An undesired race condition is created between the user plane error indication message 54 and a control plane release message which triggers the S1 release procedure. Error indication messages 34 travel faster than GTP-U control plane messages. When error indication messages 54 arrive before the GTP-U control plane messages, the error indication messages 54 cause GTP-U control plane entity 20 to remove all bearer connections 31 of a subscriber associated with destination identifier 36 before GTP-U control plane 20 has the chance to receive and process the control plane message sent from the GTP-U control plane entity (not shown) of destination computer 12*b*. The claimed invention avoids this problem by delaying the transmission of error indication message 54 so that GTP-U control plane entity 20 has the chance to receive and process the control message sent by the GTP-U control plane entity of destination computer 12*b*. As such, the claimed invention allows GTP-U control plane entity 20 to receive the control plane procedure before receiving error indication message 54.

The claimed invention delays error indication message 54 to allow control plane activities to remove the bearer 31 that includes faulty tunnel 33, without also removing all the bearer 31 connections of a subscriber associated with the faulty tunnel 33. This prevents an error indication message 54 forcing the removal of all bearers 31 corresponding to the subscriber associated with destination identifier 36. Therefore, if a subscriber is using two different bearers 31, such as a voice bearer 31 and a data bearer 31, and a determination is made that tunnel 33 of the voice bearer 31 is faulty, then the bearer 31 that includes the faulty incoming tunnel 33 is removed along with the corresponding outgoing tunnel 33 (if any), but the bearer 31 that includes the data tunnel 33 is not removed. This approach keeps the subscriber still connected to the network.

In another exemplary embodiment, the behavior of a source computer 12a after receiving error indication message 54 depends on whether the source computer 12a is a SGW or an eNodeB. If source computer 12a is a SGW located in an LTE core network and destination computer 12b is an eNodeB located in the LTE radio access network, source computer 12a will remove all the bearers 31 associated with the subscriber, even bearers 31 that include known tunnels 33. This implies that the subscriber associated with unknown tunnel 33 will momentarily loss complete connectivity to the network. If source computer 12a is an eNodeB and destination computer 12b is an SGW, then the bearer 31 with the faulty unknown tunnel 33 associated with a subscriber is removed (or tunnels 33 if the bearer 31 is bi-directional), but not other bearers 31 associated with the same subscriber.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, e.g., a point of sale terminal, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for handling transmission of error indication messages in a communication network, the method comprising:
receiving, at a destination computer associated with a destination address, a user data packet from a source computer associated with a source address;
determining whether a destination identifier included in the user data packet is known;
if it is determined that the destination identifier is known, then:
transmitting the user data packet to a destination associated with the destination identifier;
else, if it is determined that the destination identifier is unknown, then:
delaying the transmission of a first error indication message by determining whether an unknown destination table in the destination computer includes the unknown destination identifier in association with the source address, wherein, if it is determined that the unknown destination table does not include the unknown destination identifier in association with the source address, then:
storing in the unknown destination table:
the unknown destination identifier in association with the source address; and
an error indication sent flag indicating that the first error indication message has not been sent by the destination computer to the source computer;
pacing the transmission of subsequent error indication messages if subsequent user data packets received from the source computer include the unknown destination identifier; and
starting a retransmission timer, the retransmission timer defining a retransmission time to delay the transmission of the subsequent error indication messages if the subsequent user data packets received from the source computer include the unknown destination identifier that caused the first error indication message.

2. The method of claim 1, wherein if it is determined that the unknown destination table does not include the unknown destination identifier in association with the source address, the method further comprises:
starting a first transmission timer, the first transmission timer defining a predetermined time to delay transmission of the first error indication message; and
discarding the user data packet.

3. The method of claim 2, wherein delaying the transmission of the first error indication message further comprises:
if it is determined that the unknown destination table includes the unknown destination identifier in association with the source address, then:
determining whether the transmission of the first error indication message has been delayed for the predetermined amount of time.

4. The method of claim 1, wherein the destination identifier is a GTP-U tunnel endpoint identifier and the destination address is an Internet Protocol address.

5. The method of claim 3, wherein if it is determined that the transmission of the first error indication message has been delayed for the predetermined amount of time, then:
transmitting the first error indication message; else, if it is determined that the transmission of the first error indication message has not been delayed for the predetermined amount of time, then:
discarding the user data packet, wherein the user data packet includes a payload.

6. The method of claim 5, wherein if it is determined that the transmission of the first error indication message has been delayed for the predetermined amount of time, further comprising discarding the user data packet.

7. The method of claim 1, wherein if the first error indication message has been transmitted, pacing the transmission of subsequent error indication messages comprises:
determining whether the retransmission timer has expired;
if it is determined that the retransmission timer has expired, then:
discarding the user data packet;
transmitting the subsequent error indication message; and restarting the retransmission timer;
else, if it is determined that the retransmission timer has not expired, then:
discarding the user data packet.

8. A computer for handling transmission of error indication messages in a communications network, the computer comprising:
a transmitter;
a receiver in communication with the transmitter, the receiver configured to receive a user data packet from a source computer associated with a source address;
a processor in communication with the transmitter and the receiver, the processor configured to determine whether a destination identifier included in the user data packet is known; and
a memory in communication with the processor, the transmitter, and the receiver, the memory configured to store an unknown destination table;
if the processor determines that destination identifier is known, then the transmitter is configured to:
transmit the user data packet to a destination associated with the destination identifier;
else, if the processor determines that the destination identifier is unknown, then the processor is further configured to:
delay the transmission of a first error indication message by determining whether the unknown destination table includes the unknown destination identifier in association with the source address, wherein, if the processor determines that the unknown destination table does not include the unknown destination identifier in association with the source address, then:
the memory stores in the unknown destination table:
the unknown destination identifier in association with the source address; and
an error indication sent flag indicating that the first error indication message has not been sent to the source computer;
pace the transmission of subsequent error indication messages if subsequent user data packets received from the source computer include the unknown destination identifier; and
start a retransmission timer, the retransmission timer defining a retransmission time to delay the transmission of the subsequent error indication messages if the subsequent user data packets received from the source computer include the unknown destination identifier that caused the first error indication message.

9. The computer of claim 8, wherein if the processor determines that the unknown destination table does not include the unknown destination identifier in association with the source address, the processor is further configured to:
start a first transmission timer, the first transmission timer defining a predetermined time to delay transmission of the first error indication message; and
discard the user data packet.

10. The computer of claim 9, wherein delaying the transmission of the first error indication message comprises:
if the processor determines that the unknown destination table includes the unknown destination identifier in association with the source address, then:
the processor determines whether the transmission of the first error indication message has been delayed for the predetermined amount of time.

11. The computer of claim 8, wherein the unknown destination table includes an entry that includes the unknown destination identifier in association with the source address, and wherein the processor is further configured to:
delete the entry after a predetermined number of subsequent error indication messages have been transmitted by the transmitter.

12. The computer of claim 10, wherein if the processor determines that the transmission of the first error indication message has been delayed for the predetermined amount of time, then:
the transmitter transmits the first error indication message;
else, if the processor determines that the transmission of the first error indication message has not been delayed for the predetermined amount of time, then:
the processor discards the user data packet, wherein the user data packet includes a payload.

13. The computer of claim 12, wherein if the processor determines that the transmission of the first error indication message has been delayed for the predetermined amount of time, then the processor is further configured to:
discard the user data packet.

14. The computer of claim 8, wherein if the processor determines that the first error indication message has been transmitted, pacing the transmission of subsequent error indication messages further comprises:
the processor determining whether the retransmission timer has expired;
if the processor determines that the retransmission timer has expired, then the processor is further configured to:
discard the user data packet; and
restart the retransmission timer; and
the transmitter transmits the subsequent error indication message;
else, if the processor determines that the retransmission timer has not expired, then the processor discards the user data packet.

* * * * *